(12) United States Patent
Ogawa et al.

(10) Patent No.: US 7,515,785 B2
(45) Date of Patent: Apr. 7, 2009

(54) DISPERSION COMPENSATION ELEMENT, OPTICAL CRYSTAL, DISPERSION COMPENSATION SYSTEM, DISPERSION COMPENSATION METHOD

(75) Inventors: Kensuke Ogawa, Tokyo (JP); Mitsuru Fujii, Tokyo (JP)

(73) Assignee: Fujikura Ltd., Tokyo (JP)

( * ) Notice: Subject to any disclaimer, the term of this patent is extended or adjusted under 35 U.S.C. 154(b) by 167 days.

(21) Appl. No.: 10/542,383

(22) PCT Filed: Jan. 14, 2004

(86) PCT No.: PCT/JP2004/000170

§ 371 (c)(1), (2), (4) Date: Jul. 14, 2005

(87) PCT Pub. No.: WO2004/063797

PCT Pub. Date: Jul. 29, 2004

(65) Prior Publication Data

US 2006/0051016 A1 Mar. 9, 2006

(30) Foreign Application Priority Data

Jan. 15, 2003 (JP) .............................. 2003-007485

(51) Int. Cl.
*G02B 6/26* (2006.01)
*G02B 6/10* (2006.01)

(52) U.S. Cl. .............................. 385/27; 385/40; 385/130

(58) Field of Classification Search ........................ None
See application file for complete search history.

(56) References Cited

U.S. PATENT DOCUMENTS 5,570,439 A * 10/1996 Ido et al. ...................... 385/37

(Continued)

FOREIGN PATENT DOCUMENTS

CN 1300950 A 6/2001

(Continued)

OTHER PUBLICATIONS

Suguru Asano, Masamitsu Mochizuki, Hosho So, Susumu Noda, "2 Jigen Photonic Kessho ni yoru Hacho Bungoha Device -Men'nai e Tero Kozo no Teinan-", Dai 49 Kai Oyo Butsurigaku Kankei Rengo Koenkai Koen Yokoshu, No. 3, 29p-L-9, Mar. 2002, p. 1039.

(Continued)

*Primary Examiner*—Sung Pak
*Assistant Examiner*—Omar Rojas
(74) *Attorney, Agent, or Firm*—Sughrue Mion, PLLC

(57) ABSTRACT

In a dispersion compensation element 10X, a plurality of regions (I) and (II) mutually different in radius and interval of holes 24 are set, and voltages applied at electrodes 30A and 30B are controlled in respective regions (I) and (II) to make variable the sign and the absolute value of chromatic dispersion compensation. In a dispersion compensation system formed by using the dispersion compensation element 10X, an optical pulse picked up from an optical fiber transmission line is monitored, and the amount of voltage applied at the dispersion compensation element 10X is controlled based on its chromatic dispersion information to perform dispersion compensation of the optical pulse propagated through the optical fiber transmission line. Alternatively, dispersion compensation can be performed by varying the carrier density of the waveguide by applying a voltage to change the refractive index of the waveguide.

10 Claims, 13 Drawing Sheets

U.S. PATENT DOCUMENTS

| | | | |
|---|---|---|---|
| 6,731,846 B2 * | 5/2004 | Hosomi et al. | 385/123 |
| 6,760,513 B1 * | 7/2004 | Heitmann et al. | 385/27 |
| 6,768,822 B1 * | 7/2004 | Robinson et al. | 385/10 |
| 6,931,189 B2 * | 8/2005 | Lee et al. | 385/128 |
| 2002/0021878 A1 | 2/2002 | Allan et al. | |
| 2002/0146196 A1 | 10/2002 | Shirane et al. | |
| 2002/0172456 A1 | 11/2002 | Hosomi et al. | |
| 2003/0035625 A1 * | 2/2003 | Riant et al. | 385/37 |

FOREIGN PATENT DOCUMENTS

| | | | |
|---|---|---|---|
| EP | 997751 A | 5/2000 | |
| EP | 1251647 A1 | 10/2002 | |
| JP | 06-311114 A | 11/1994 | |
| JP | 2000-121987 A | 4/2000 | |
| JP | 2002-243935 A | 8/2002 | |
| JP | 2002-303836 A | 10/2002 | |
| JP | 2002-333536 A | 11/2002 | |
| JP | 2003-279764 A | 10/2003 | |
| WO | WO 02/14914 A1 | 2/2002 | |

OTHER PUBLICATIONS

Masahiro Mori, Toshihiko Baba, "Chirp Kozo o Motsu Photonic Kessho Doharo no Kento", Dai 50 Kai Oyo Butsurigaku Kankei Rengo Koenkai Koen Yokoshu, No. 3, 28p-YN-1, Mar. 2003, p. 1130.

Hosomi K., Katsuyama T., A Dispersin Compensator Using Coupled Defects in a Photonic Crystal, IEEE J.Q.Electron., vol. 38, No. 7, Jul. 2002, pp. 825 to 829.

* cited by examiner

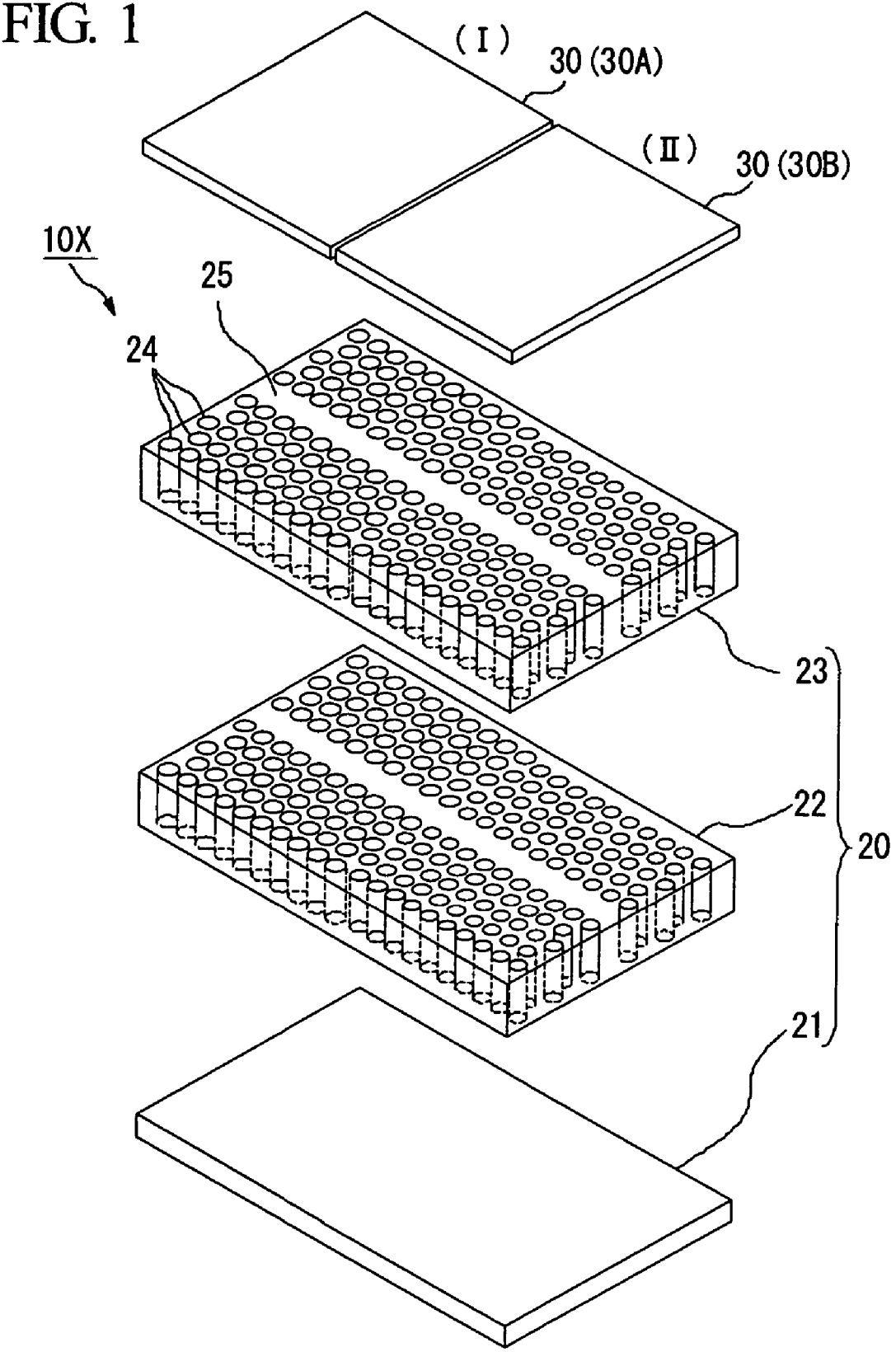

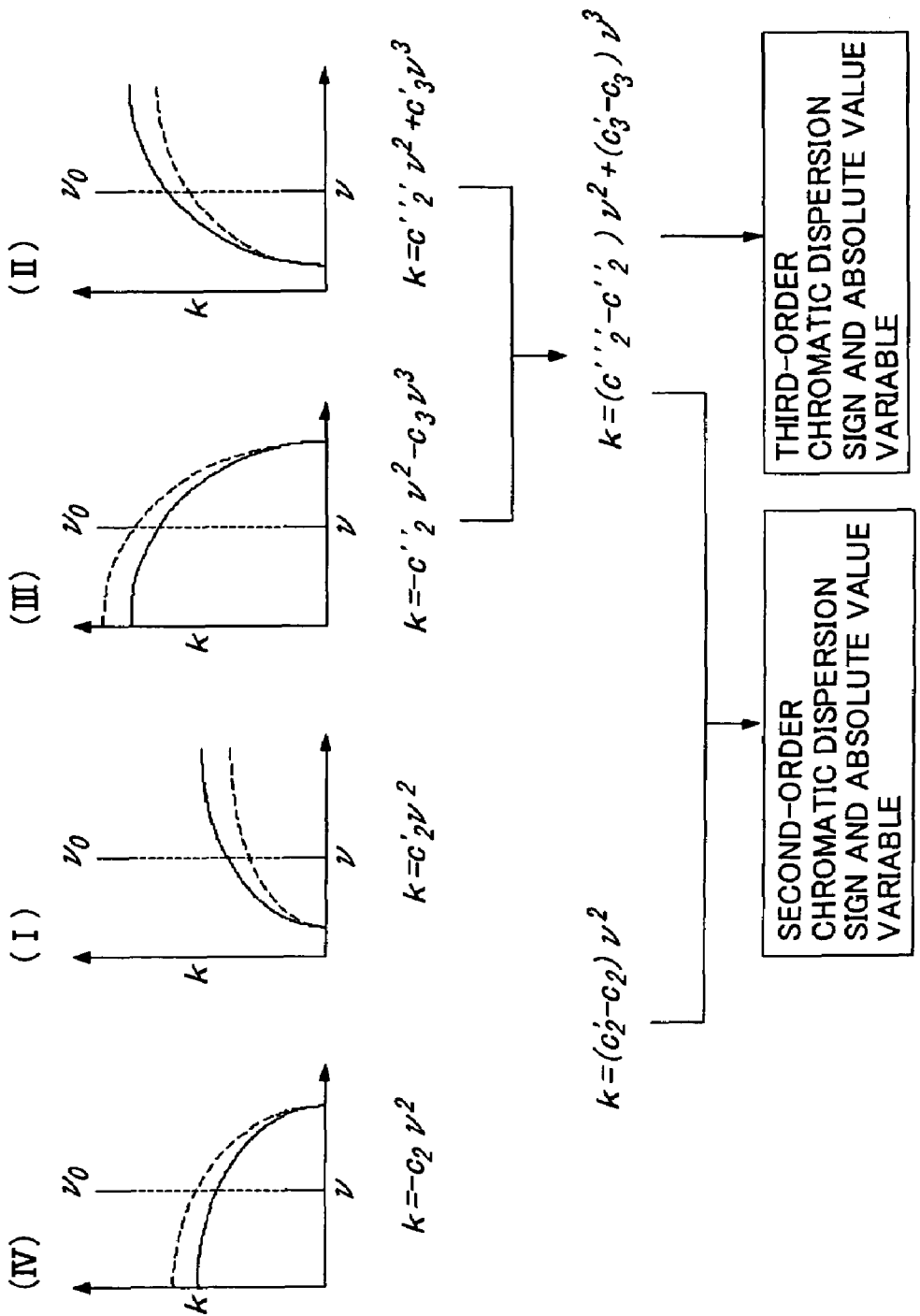

DISPERSION COMPENSATION ELEMENT, OPTICAL CRYSTAL, DISPERSION COMPENSATION SYSTEM, DISPERSION COMPENSATION METHOD

TECHNICAL FIELD

The present invention relates to a dispersion compensation element, a dispersion compensation system and the like, which compensate chromatic dispersion occurring when an optical pulse is transmitted.

BACKGROUND ART

In recent years, data communications have been under shift to those via optical fibers and accordingly, the data transmission speed has been enhanced more dramatically than before.

It is under consideration to conduct communications at a transmission speed of 160 Gbit/s which is much higher than the current transmission speed, or greater, using ultra-short pulses in such data communications via optical fibers in near future.

Problems of crosstalk and transmission errors always accompany data communications, but as the data transmission speed is enhanced, the width of each optical pulse and the interval between optical pulses in tandem with each other spontaneously decrease, and therefore the problem becomes very important.

The speed at which light travels through a material is determined by the refractive index of the material, and the speed of light decreases as the refractive index increases. In materials such as glass, semiconductors and optical crystals, the refractive index varies with the frequency of light (wavelength in air), and therefore the speed of light depends on the wavelength. It is known that due to this wavelength dependence of the refractive index, the waveform of an optical pulse is distorted and the time length of the pulse increases while the optical pulse travels through a material. A characteristic such that the speed of light varies depending on the wavelength of light in this way is hereinafter referred to as chromatic dispersion or merely dispersion.

As described above, the waveform of the optical pulse is distorted and the time length of the optical pulse increases while the optical pulse travels through optical fibers, but there arises no significant problem because the time length of the optical pulse is large at a conventional transmission speed. However, if the data transmission speed increases, optical pulses in tandem with each other interfere with each other, and so on, to cause crosstalk and transmission errors. Therefore, data communication at a higher speed cannot be achieved by merely enhancing the transmission speed with a current technique.

For countering this problem, an attempt has been already made to compensate chromatic dispersion using, for example, a photonic crystal.

The photonic crystal has a structure in which two materials having different refractive indexes are periodically arranged, and part of this arrangement is made defective to form a defect waveguide (continuous defect part), whereby only light having a specific frequency passes, and a waveguide mode giving specific chromatic dispersion to the light occurs. By using this waveguide mode, chromatic dispersion of an optical fiber transmission line is compensated (see, for example, Kazuhiko Hosomi, Toshio Katsuyama, "Light Propagation Characteristics of Photonic Crystal Coupled Defect waveguide (2)", "Proceedings of 63rd Academic Meeting of Japan Society of Applied Physics, Vol. 3", Japan Society of Applied Physics, Sep. 24, 2002, p. 917).

In addition, a technique using an optical fiber diffraction grating as a dispersion compensation element is implemented as a structure similar to that of the photonic crystal. This is an attempt to compensate chromatic dispersion in a broad spectral band using a chirp optical fiber diffraction grating in which the period of the diffraction grating is changed along the length of the optical fiber (see, for example, Akira Suzuki, Shinichi Wakabayashi, "Technique for Dispersion Compensation of Short Pulse", "Optronics", Optronics Co., Ltd., 2002, vol. 21, No. 4, p. 161-165).

For dispersion compensation for optical pulses generated by an ultra-short pulse laser for physicochemistry, techniques using a prism pair or a diffraction grating pair have come into widespread use. These techniques are intended for compensating mainly positive chromatic dispersion (see, for example, J-C Diels, W Rudolph, "Ultrashort Laser pulse Phenomena", USA, Academic Press, 1996, p. 43-99).

However, further enhancement of the transmission speed cannot be sufficiently accommodated by simply using the conventional chromatic dispersion compensation technique described above.

That is, chromatic dispersion results from the dependency of a phase of an optical pulse on the wavelength (or frequency, hereinafter referred to simply as wavelength) as described above. Generally, the phase of an optical wave is expressed as a polynomial expression expanded with terms different in order (power index) of the wavelength with a certain wavelength at the center. It is known that the coefficient of the second-order term corresponds to the lowest-order chromatic dispersion, and as coefficients of terms of subsequent orders, coefficients of third-order, fourth-order and fifth-order terms follow (see, for example, Keisuke Ogawa, "Measurement of Ultra-Short Optical Pulse", "Ultrahigh Speed Optoelectronics Technique Handbook", Sipec Corporation, Jan. 31, 2003, Chapter 2, 2.4).

For the current optical pulse transmission speed, compensation of chromatic dispersion for the second-order term is enough, but as the transmission speed is enhanced, the time length of the optical pulse for use in data transmission becomes shorter, and in inverse proportion thereto, the spectral bandwidth of the optical pulse increases. Thus, as the transmission speed is enhanced, distortion of the waveform of the optical pulse cannot be eliminated unless wavelength compensation coefficients of up to higher orders are compensated over a broader spectral band.

In the conventional chromatic dispersion compensation technique using a photonic crystal or optical fiber grating, chromatic dispersion can be compensated for each order such as second, third or fourth order, however, chromatic dispersion cannot be compensated for multiple orders. Chromatic dispersion compensation meeting ultrahigh-speed large-capacity optical communication using a broad spectral band cannot be achieved.

An ultrahigh-speed large-capacity optical fiber transmission line is designed so as to have an optimum optical pulse transmission characteristic in itself. That is, it is configured such that chromatic dispersion is zero as the entire transmission line.

However, for example, an optical fiber transmission line laid on the sea bottom or the like may depart from conditions under which the optical fiber transmission line is optimized by influences of temperature, atmospheric pressure, vibrations and the like. In such a situation, the chromatic dispersion in the optical fiber transmission line constantly changes between positive and negative signs.

In contrast to this, in the conventional technique, it is difficult to make the sign of chromatic dispersion compensation variable independently of the absolute value of chromatic dispersion when the chromatic dispersion changes between positive and negative signs. This means that it is difficult to cope with a situation in which the chromatic dispersion value constantly changes around zero between positive and negative signs.

The "positive" chromatic dispersion indicates that the speed of light increases as the wavelength increases, and the "negative" chromatic dispersion indicates that the speed of light decreases as the wavelength increases.

The present invention has been made based on such technical problems, and its object is to provide a dispersion compensation element, a dispersion compensation system and the like which can enhance the transmission speed of optical pulses.

DISCLOSURE OF THE INVENTION

Under such an object, a dispersion compensation element of the present invention compensates chromatic dispersion of an optical pulse input from outside, and is characterized by comprising a waveguide guiding the optical pulse from an input edge to an output edge, and dispersion varying means for making variable the absolute value and the sign of chromatic dispersion given to the optical pulse in the waveguide.

In this way, by making variable the absolute value and the sign of chromatic dispersion given to the optical pulse by dispersion varying means, dispersion compensation coping with a variation in chromatic dispersion of the optical pulse input to the dispersion compensation element can be performed if such a variation occurs.

Dispersion varying means having any configuration may be employed, but the dispersion varying means described below is suitable.

First, the waveguide can be formed by an optical element such as, for example, a photonic crystal.

The photonic crystal is formed by alternately and periodically arranging two materials having different dielectric constants, and the waveguide can be formed by continuously missing one material existing in the other material. In the present invention, a plurality of regions different in combination of the size and the interval of one material existing in the other material are preferably arranged along a direction in which this waveguide continues. One or both of one material and the other material can be varied for each region if it allows production.

A plurality of regions can made to have mutually different signs of chromatic dispersion for optical pulses to provide positive and negative regions. A plurality of regions can be made different in order of chromatic dispersion for optical pulses. In this way, dispersion compensation can be performed for chromatic dispersion of positive and negative signs and of multiple orders. If regions having mutually different signs of chromatic dispersion are provided for each order of chromatic dispersion for the optical pulse, a variation between positive and negative signs can be coped with for each order thereof. In this case, the above described regions can be provided in a number of 2(n−1) as long as the dispersion compensation element compensates chromatic dispersion of up to the nth order.

A plurality of regions provided in this way are preferably provided in an arrangement in which reflection of the optical pulse at a boundary between regions in tandem with each other is minimized.

For each of the regions, an energy supplier for independently supplying energy of electricity, heat, pressure and the like from outside is provided for changing the refractive index of the waveguide, whereby dispersion varying means for freely varying the absolute value and the sign of chromatic dispersion given to the optical pulse can be formed.

By applying a voltage at the energy supplier, the carrier density of the waveguide can be varied, and the refractive index of the waveguide can be changed. In this case, a terminal unit which has a carrier density different from that of the waveguide is preferably provided. The energy supplier for applying the voltage is electrically connected to this terminal unit.

The crystal element of the photonic crystal may be formed with a single crystal or may be formed by combination of a plurality of separate crystals as long as it comprises a plurality of regions as described above.

The present invention may be considered as a dispersion compensation element comprising a waveguide guiding an optical pulse from an input edge to an output edge, and dispersion varying means which has a carrier density different from that of the waveguide, and makes variable chromatic dispersion given to the optical pulse in the waveguide by applying a voltage from outside to change the refractive index of the waveguide, wherein the chromatic dispersion of the optical pulse input from outside is compensated.

Such a dispersion compensation element may use a photonic crystal in which a plurality of regions different in combination of the size and the interval of one material existing in the other material are arranged along a direction in which the waveguide continues, but may also use a photonic crystal having only one region having a single combination of the size and the interval of one material existing in the other material.

The present invention may be considered as an optical crystal itself such as a photonic crystal. That is, the optical crystal of the present invention comprises a periodic arrangement layer formed by alternately and periodically arranging two materials having different dielectric constants, characterized in that in the periodic arrangement layer, a continuous defect part in which one material periodically arranged in the other material is made continuously defective is formed, and a plurality of regions different in characteristics associated with periodic arrangement of one material in the other material are formed.

The characteristics associated with periodic arrangement include the size, the interval and the like of one material arranged in the other material.

In this periodic arrangement layer, a plurality of regions are preferably mutually different in absolute value or sign of chromatic dispersion given to the optical pulse when the optical pulse passes through the continuous defect part.

An optical crystal can also be formed by depositing on the periodic arrangement layer another layer formed with a material having a refractive index different from that of the other material forming the periodic arrangement layer.

The continuous defect part may be formed three-dimensionally on the periodic arrangement layer, but preferably it is formed two-dimensionally for improving the ease of the design and production. For the same reason, the continuous defect part is formed linearly from one end side of the periodic arrangement layer toward the other end side thereof.

A region of different density having a carrier density different from that of the continuous defect part may be formed on the periodic arrangement layer. In this case, the region of different density preferably has a carrier density higher than that of the continuous defect part.

An electrode for applying a voltage to the periodic arrangement layer is connected to this region of different density. That is, the region of different density functions as a terminal unit. In this case, the region of different density preferably has an area larger than the areas of the plurality of regions described above in order to control the electric resistance.

The present invention may be considered as a dispersion compensation system for an optical pulse propagated via an optical pulse transmission line. The dispersion compensation system in this case picks up the optical pulse propagated via the optical pulse transmission line by an optical pulse pickup unit provided on the optical pulse transmission line, and gives chromatic dispersion to the optical pulse propagated via the optical pulse transmission line by the dispersion compensation unit to compensate chromatic dispersion. At this time, the absolute value and the sign of chromatic dispersion given to the optical pulse by the dispersion compensation unit are feedback-controlled by a control unit based on the optical pulse picked up by the optical pulse pickup unit.

The dispersion compensation unit may comprise a waveguide comprising a plurality of regions mutually different in chromatic dispersion given to the optical pulse input from the optical pulse transmission line, and an energy supplier for independently supplying energy changing the refractive index of the waveguide from outside for each region of the waveguide. The control unit controls the amount of energy supplied by the energy supplier to control the absolute value and the sign of chromatic dispersion given to the optical pulse by the dispersion compensation unit.

The dispersion compensation unit can further comprise a data storage unit storing data associating the characteristics of the optical pulse picked up by the optical pulse pickup unit to the amount of energy supplied by the energy supplier. In this case, the control unit references the data storage unit based on the characteristics of the optical pulse picked up by the optical pulse pickup unit, i.e. the pre-compensation optical pulse obtained by monitoring this optical pulse, and obtains data of the amount of energy supplied by the energy supplier. The control unit then controls the absolute value and the sign of chromatic dispersion given to the optical pulse by the dispersion compensation unit based on data of the amount of energy.

The present invention may be considered as a dispersion compensation system for an optical pulse propagated via an optical pulse transmission line, comprising an optical pulse pickup unit provided on the optical pulse transmission line and picking up the optical pulse propagated via the optical pulse transmission line, a dispersion compensation unit provided on the optical pulse transmission line and giving chromatic dispersion to the optical pulse propagated via the optical pulse transmission line, and a voltage control unit controlling a voltage applied to the dispersion compensation unit for changing the refractive index of the dispersion compensation unit by varying the carrier density of the dispersion compensation unit based on the optical pulse picked up by the optical pulse pickup unit.

The present invention may considered as a dispersion compensation method comprising the steps of: picking up an optical pulse propagated via an optical pulse transmission line; determining the absolute value and the sign of chromatic dispersion given to the optical pulse propagated via the optical pulse transmission line based on the optical pulse picked up; and varying chromatic dispersion given to the optical pulse propagated via the optical pulse transmission line based on the determined absolute value and the sign of chromatic dispersion.

BRIEF DESCRIPTION OF THE DRAWINGS

FIG. 1 is a perspective view showing the configuration of a dispersion compensation element in this embodiment;

FIG. 5 shows a relationship between a normalized wave number and a normalized frequency, wherein

FIG. 6 shows the configuration of the dispersion compensation element where dispersion compensation of multiple orders is performed, wherein

FIG. 7 shows a compensation principle where dispersion compensation of multiple orders is performed;

BEST MODE FOR CARRYING OUT THE INVENTION

This invention will be described in detail below based on the embodiment shown in accompanying drawings.

FIG. 1 is a view for explaining the outlined configuration of a dispersion compensation element constituting a dispersion compensation system in this embodiment.

Figure 2A:
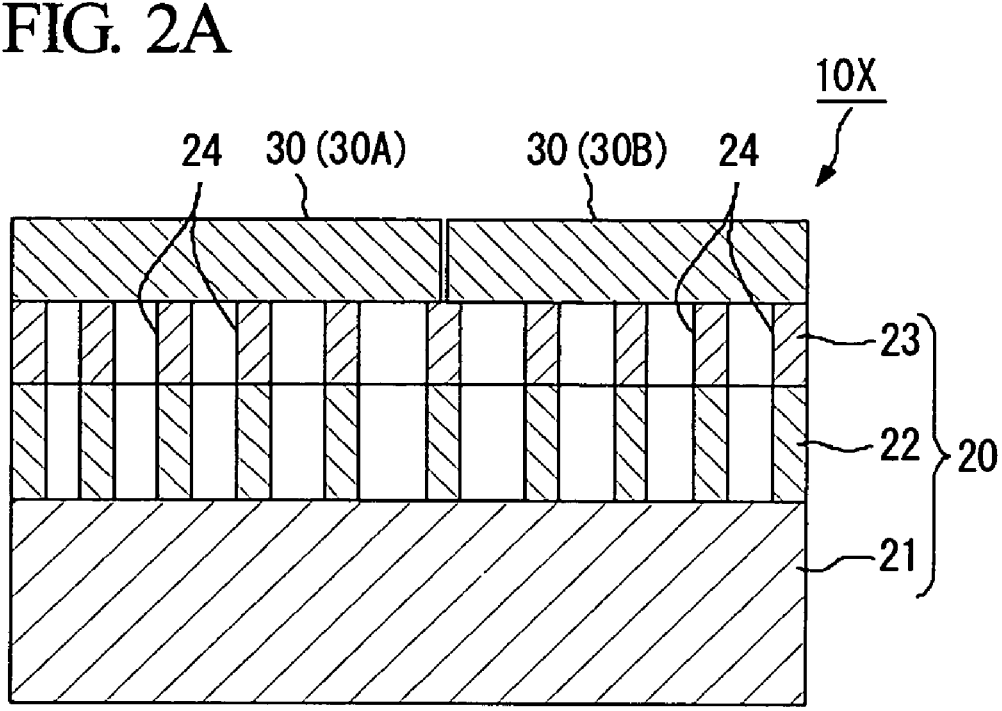
FIG. 2A is a sectional view of the dispersion compensation element.
Figure 2B:
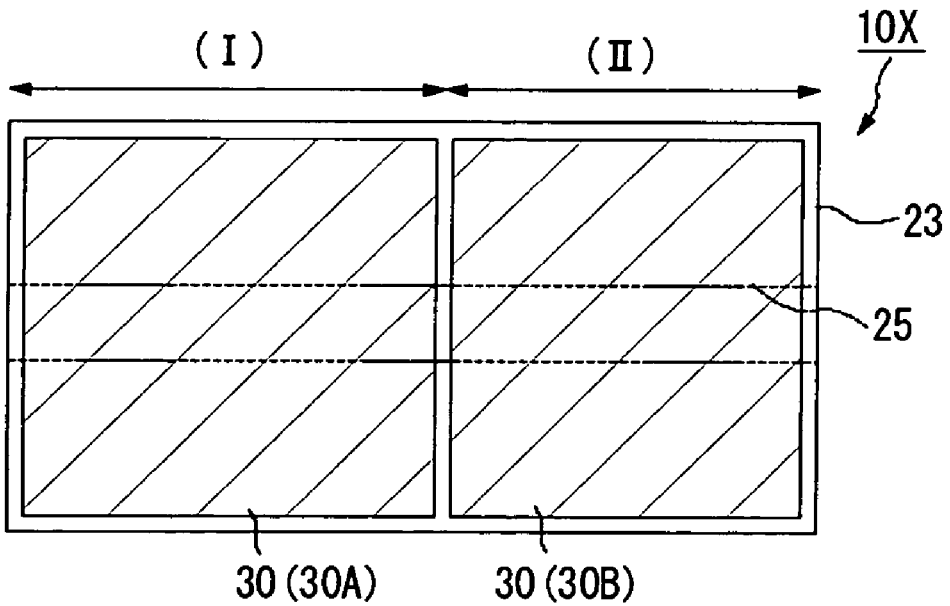
FIG. 2B is a plan view of FIG. 2A.

As shown in FIGS. 1 and 2, a dispersion compensation element (dispersion compensation unit) 10X comprises a photonic crystal unit 20 and an electrode (dispersion varying means, energy supplier) 30 provided on one side of the photonic crystal unit 20.

The photonic crystal unit 20 has a clad layer (other layer) 22 and a core layer (periodic arrangement layer) 23 deposited on a substrate 21, the substrate 21 is formed with, for example, silicon (Si), the clad layer 22 is formed with a silicon oxide film ($SiO_2$) or silicon nitride film, and the core layer 23 is formed with a silicon crystal (Si) that is a dielectric material.

Impurities are added to the substrate 21 for imparting conductivity thereto.

Figure 3:
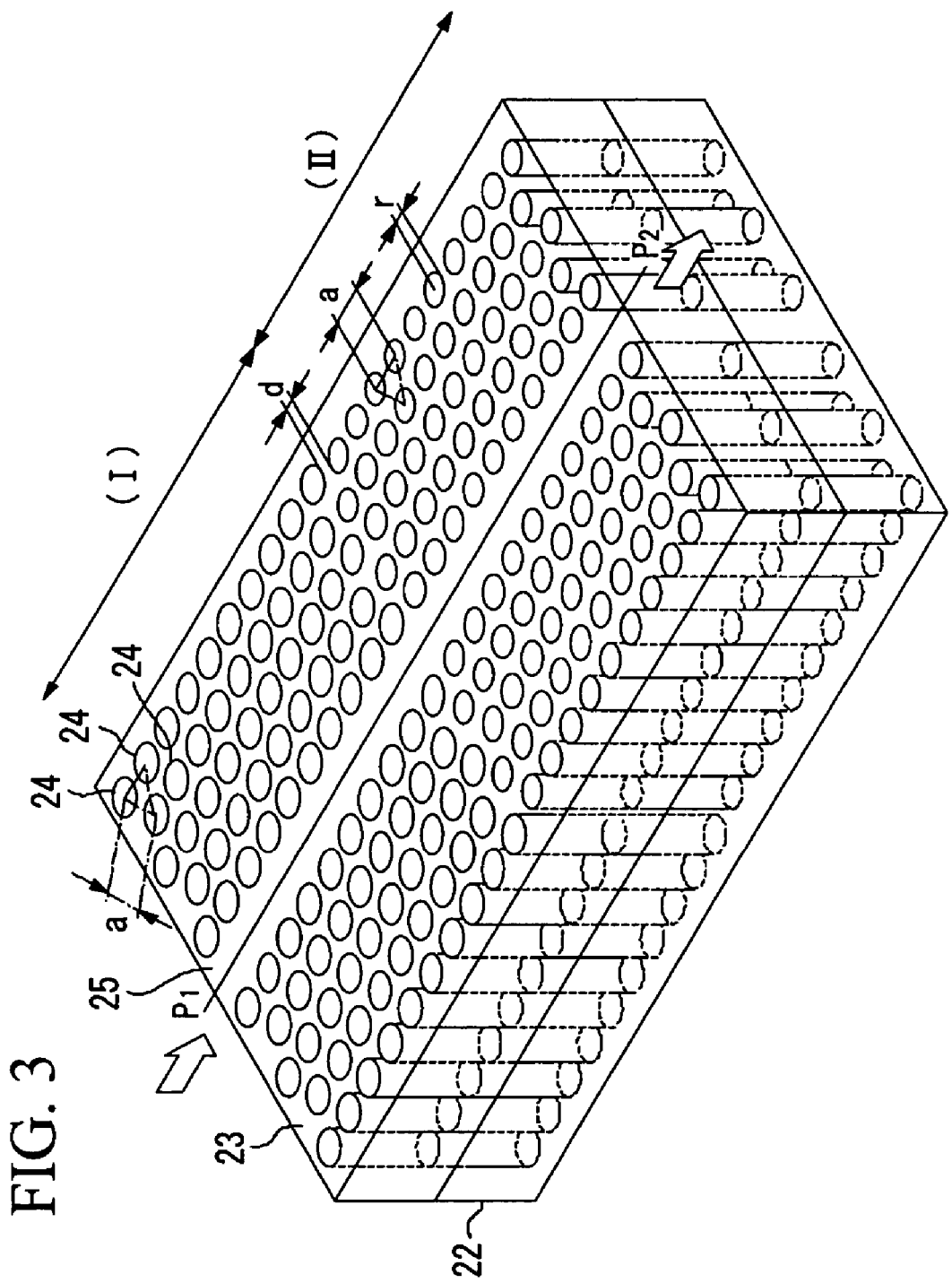
FIG. 3 is a perspective view of a core layer.

As shown in FIG. 3, holes 24 are formed periodically in the core layer 23. In this way, the core layer 23 is formed in such a manner that two materials having different dielectric constants (refractive indexes) are alternately and periodically arranged with a base material (e.g. Si) of the core layer 23 and a material filling portions of the holes 24 (generally a gas such as air is filled, but other materials may be filled).

In FIG. 3, holes 24 are formed not only in the core layer 23, but also in the clad layer 22, but this is for production reasons, and thus holes 24 should be formed in at least the core layer 23.

Holes 24 formed in the core layer 23 each has a predetermined radius (size) r, and are arranged in a form of a triangular grating having a regular triangle as a unit cell, and holes 24 in each unit cell are spaced at predetermined intervals (length of one side of the regular triangle) a.

The core layer 23 comprises regions (I) and (II) set so as to be different in radius r and interval a of the hole 24 described above.

In this core layer 23, holes 24 are lost (no holes 24 are formed) linearly continuously in a direction of cutting through regions (I) and (II), whereby so called a defect waveguide (waveguide, continuous defect part) 25 is formed.

In the photonic crystal unit 20 having such a configuration, other materials having different refractive indexes exist on the upper and lower surfaces of the core layer 23, respectively (clad layer 22 on the lower side and air on the upper side), whereby light input from the input edge of the defect waveguide 25 on one edge side is propagated while reflecting at the upper and lower surfaces of the core layer 23, and is output from the output edge of the defect waveguide 25 on the other edge side. When light is propagated through the defect waveguide 25, the light receives chromatic dispersion matching the radius r and the interval a of the hole 24 of the region (I) while it is propagated through the region (I) of the core layer 23, and the light receives chromatic dispersion matching the radius r and the interval a of the hole 24 of the region (II) while it is subsequently propagated through the region (II). That is, light exiting from the defect waveguide 25 of the core layer 23 receives chromatic dispersion of combined regions (I) and (II).

As shown in FIGS. 1 and 2, the electrode 30 is provided on one side of the photonic crystal unit 20, specifically not on the substrate 21 but on the side facing the core layer 23. The electrode 30 is intended for supplying energy changing the refractive index of the core layer 23 from outside. In this embodiment, as the electrode 30, electrodes 30A and 30B are provided independently in correspondence with the regions (I) and (II), respectively.

An electric power source (not shown) and a controller (not shown) controlling the amount of voltage applied at the electric power source are externally connected to electrodes 30A and 30B, whereby dispersion varying means is formed.

If a voltage (bias voltage) is applied between electrodes 30A, 30B and the substrate 21 having conductivity, the refractive indexes of regions (I) and (II) of the core layer 23 are changed according to the applied voltage. Utilizing this, voltages applied from the electric power source to the electrode 30A of the region (I) and the electrode 30B of the region (II) are individually controlled to vary chromatic dispersion given at regions (I) and (II) independently, whereby optimum dispersion compensation is performed.

A preferred example of the dispersion compensation element 10X described above will now be specifically described.

As described previously, the substrate 21 of the photonic crystal 20 is formed with silicon (Si) containing impurities so as to have conductivity, the clad layer 22 is formed with a silicon oxide film ($SiO_2$) or silicon nitride, and the core layer 23 is formed with a silicon crystal (Si) that is a dielectric material. The thicknesses of the clad layer 22 and the core layer 23 are 1000 nm and 220 nm, respectively. These thicknesses of the clad layer 22 and the core layer 23 meet a condition with which the transverse mode of the defect waveguide 25 is single (23 nm to 240 nm with respect to transverse electric (TE) polarized light).

Assuming that refractive indexes of air, the core layer 23 and the clad layer 22 are represented by $n_{air}$, $n_{core}$ and $n_{clad}$, respectively, they are set to $n_{air}=1.00$, $n_{core}=3.50$ and $n_{clad}=1.45$.

In this photonic crystal unit 20, a resist is coated on a material forming the core layer 23, and a predetermined pattern of holes 24 is formed on the resist by a method such as photolithography. A pattern of holes 24 for forming the defect waveguide 25 is formed on the material forming the core layer 23 by dry etching. In this case, the portion of the hole 24 is constituted by air.

Holes 24 are arranged in a form of a triangular grating having a regular triangle as a unit cell, and regions (I) and (II) are different in period. The period is set to a=493 nm for the region (I) and a=473 nm for the region (II). For both regions, the radius r is set to meet the requirement of r/a=0.4. The interval d between holes 24 adjacent at the boundary of regions (I) and (II) (see FIG. 1) is smaller than the value of the larger period of the triangular grating, i.e. 473 nm. The defect waveguide 25 through which light is propagated has a linear shape formed along a line P1-P2 with the line at the center, and this defect waveguide 25 is formed by filling (making defective) the hole 24 of the region (I) in an amount equivalent to one hole. The width of the defect waveguide 25 of the region (II) is made equal to that of the region (I). The length of the defect waveguide 25 in each of regions (I) and (II) is 100 μm, and the total length of the defect waveguide 25 in the dispersion compensation element 10X is 200 μm.

Figure 4:
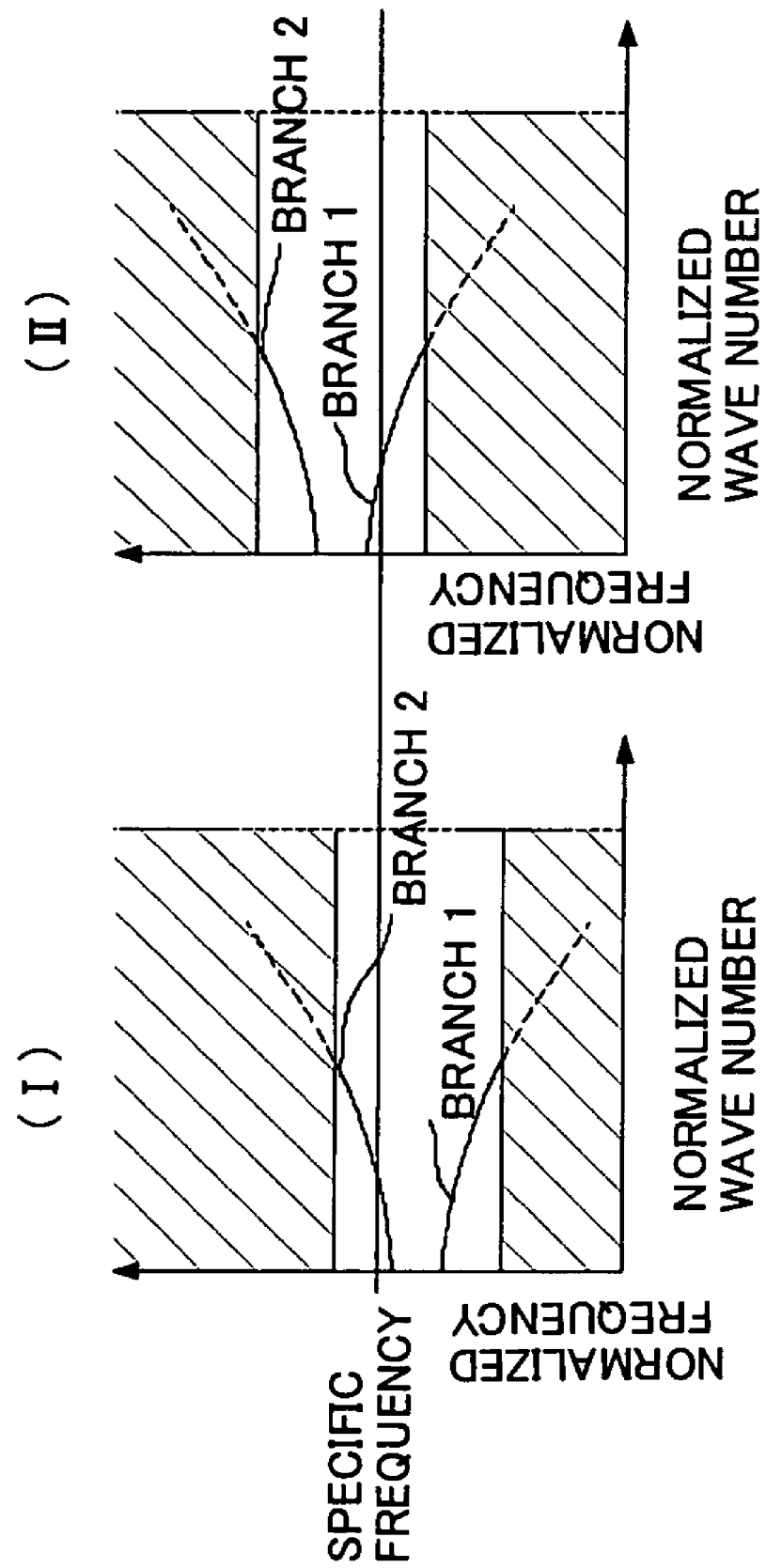
FIG. 4 is a frequency-wave number characteristic curve, and shows a difference in waveguide mode between regions of (I) and (II)

FIG. 4 shows a view for explaining the principle of dispersion compensation in the dispersion compensation element 10X.

Regions (I) and (II) of the photonic crystal unit 20 each have a band characteristic characterizing light wave propagation shown in FIG. 4. In the defect waveguide 25, waveguide modes of branches 1 and 2 different in sign of curvature are formed in photonic gaps.

The longitudinal axis and horizontal axis of the graph of FIG. 4 represents a frequency of light and a wave number normalized by 1/a. The waveguide mode is in a transverse electric (TE) polarized light state. In the defect waveguide 25, light is propagated in the mode of the branch 1 or 2.

Regions (I) and (II) are set so as to be mutually different in radius r and interval a of the hole 24 so that the mode of the upper side branch 2 is generated in the region (I) of the defect waveguide 25 and the mode of the lower side branch 1 is generated in the region (II) when the central frequency of an input optical pulse is a specific frequency.

Figure 5A:
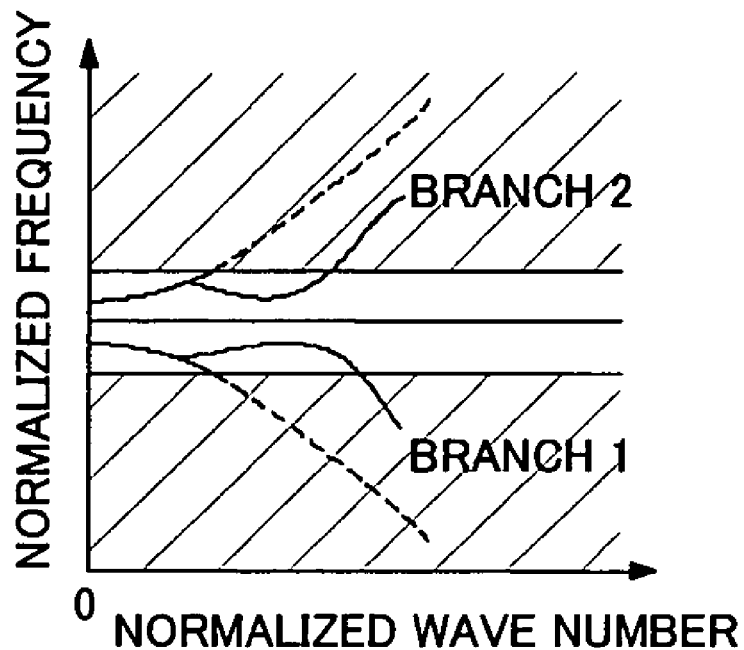
FIG. 5A shows the case where branches of the waveguide mode are closest to each other at zero wave number.
Figure 5B:
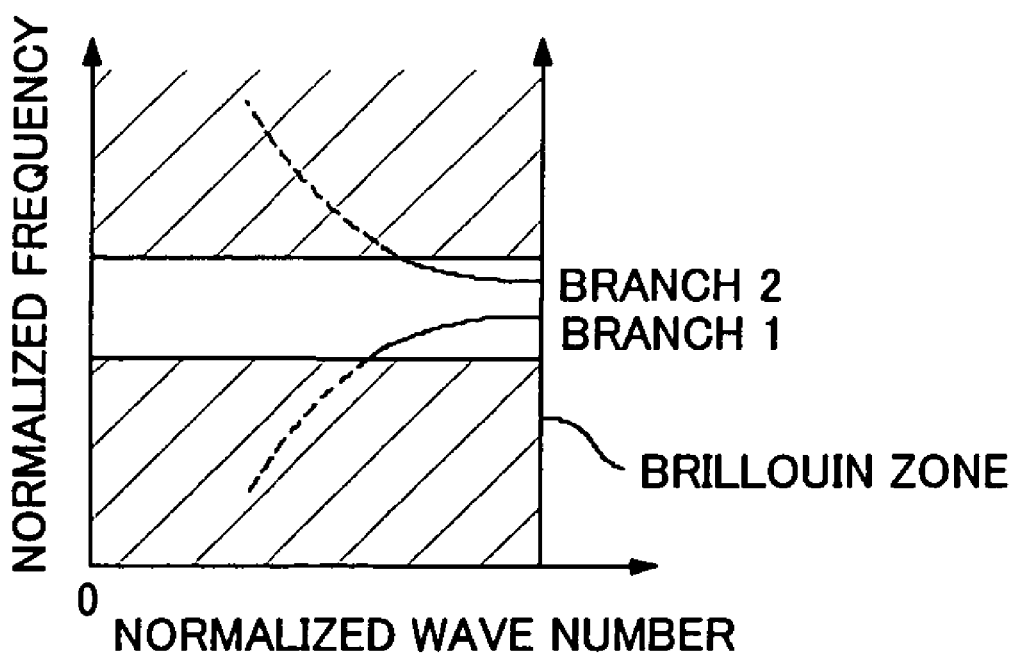
FIG. 5B shows the case where the branches are closest to each other at a boundary with a Brillouin zone.

For the waveguide mode, there are cases where branches 1 and 2 are closest to each other at zero wave number as shown in FIG. 5A, where the branches are closest to each other at a Brillouin zone boundary as shown in FIG. 5B, and both cases are applicable, but this embodiment covers the photonic crystal having the characteristics of FIG. 5A.

When a situation in which light is propagated through a material is examined, a relationship between the frequency and the wave number is important. By this relationship, the speed at which light is propagated through a material is determined. This speed refers to a speed at which the center of gravity of the optical pulse moves, and is called a group velocity. The group velocity is given as a gradient (differential coefficient) of a frequency-wave number characteristic curve. In vacuum or air, the frequency-wave number characteristic has a linear shape, and the group velocity is constant independently of the frequency, but in a material such as a glass, semiconductor or metal, the frequency-wave number characteristic does not have a linear shape, and the group velocity varies depending on the frequency. Thus, if light input from air passes through a material, the group velocity varies depending on the frequency (which may translate into wavelength) of light input from air. The optical pulse includes not only a single wavelength, but also various wavelength components, and therefore if the group velocity depends on the wavelength, the width of the optical pulse increases as it is propagated through the material, and thus the waveform is distorted. When the group velocity depends on the wavelength (or frequency), the dependency is called chromatic dispersion. The rate at which the group velocity varies depending on the wavelength (frequency) is called group velocity dispersion. The group velocity dispersion equals second-order differential of the frequency-wave number characteristic curve.

In the curve representing the frequency-wave number relationship shown in FIG. 4, branches 1 and 2 have mutually inverted signs of group velocity dispersion. Thus, by adjusting bias voltages applied to regions (I) and (II), the curve is varied, whereby positive, zero or negative group velocity dispersion can be generated as the entire defect waveguide 25 including regions (I) and (II). When a certain optical fiber transmission line is targeted, bias voltages (I) and (II) are changed so that group velocity dispersion in an amount opposite in sign and equal in absolute value to group velocity dispersion of the optical fiber transmission line is generated, whereby the chromatic dispersion of the targeted optical fiber transmission line is removed.

Figure 6A:
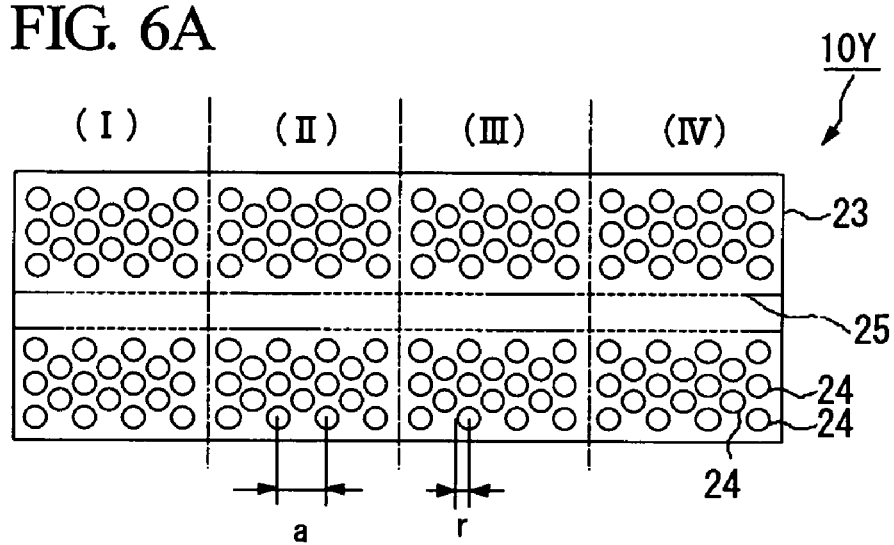
FIG. 6A is a plan view of the core layer.

The dispersion compensation element 10X shown in FIG. 1 is intended for achieving positive and negative dispersion compensation, whereas the dispersion compensation element in FIG. 6 is intended for dispersion compensation for a term of multiple orders.

A dispersion compensation element (dispersion compensation unit) 10Y is basically same as the dispersion compensation element 10X shown in FIG. 1, and therefore common components are assigned same symbols and descriptions thereof are not presented but the photonic crystal unit 20 has the clad layer 22 and the core layer 23 deposited on the substrate 21.

The radius r and the interval a of holes 24 periodically formed in the core layer 23 of the photonic crystal unit 20 is set so as to be different for each region.

The dispersion compensation element 10Y accommodating dispersion compensation of multiple of multiple orders has 2(n−1) regions if it achieves dispersion compensation of terms of up to the nth order.

As shown in FIG. 6, if dispersion compensation of terms of up to third order is performed, n equals 3 and the number of regions is 2(n−1)=2(3−1)=4. In these four regions (I), (II), (III) and (IV) the radius r and the interval a of the hole 24 is set so that total four ways of chromatic dispersion, i.e. the positive and negative of the second-order term and the positive and negative of the third-order term are provided.

FIG. 7 is a view for explaining the case where dispersion compensation of terms of up to third order is performed.

As shown in FIG. 7, if the region (IV) gives positive wavelength of the second-order term, the region (I) gives negative chromatic dispersion of the second-order term, the region (III) gives positive chromatic dispersion of the third-order term and the region (II) gives negative chromatic dispersion of third-order term, the curve is expressed by the equations of:

$k = -c_2 v^2$ for region (IV);

$k = c'_2 v^2$ for region (I);

$k = -c''_2 v^2 - c_3 v^3$ for region (III); and $k = c'''_2 v^2 + c'_3 v^3$.

Each equation expresses the frequency-wave number characteristic curve in the vicinity of the central frequency by approximation with a power of v.

k is a wave number, c is a positive number, and v is a frequency represented with a central frequency as an origin.

In the equation of $k = (c'_2 - c_2 + c'''_2 - c''_2) v^2 + (c'_3 - c_3) v^3$ as the total of the regions (I) to (IV), the coefficient of the second-order term: $(c'_2 - c_2 + c'''_2 - c''_2)$ gives a second-order dispersion compensation value in the dispersion compensation element 10Y, and the coefficient of the third-order term: $(C'_3 - c_3)$ gives a third-order dispersion compensation value in the dispersion compensation element 10Y.

Figure 6B:
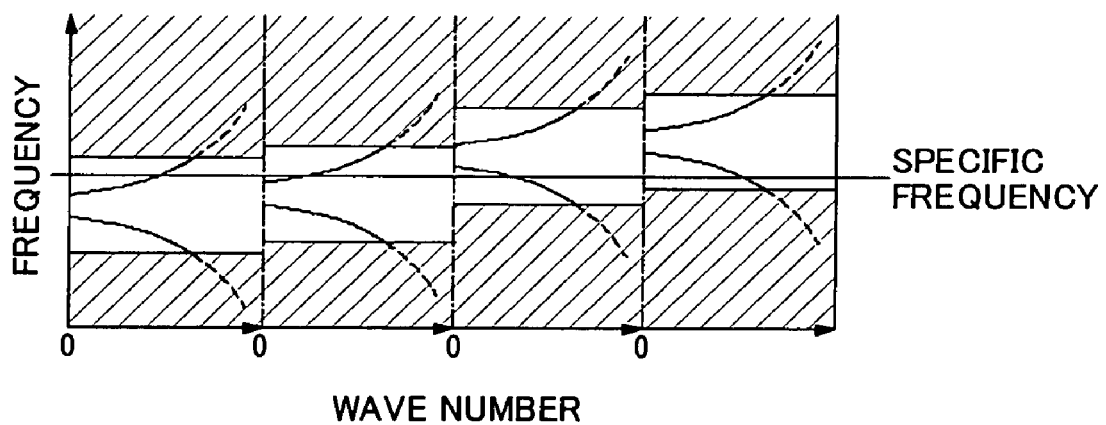
FIG. 6B shows a difference in waveguide mode between regions.

The dispersion compensation element 10Y described above comprises, for example, four regions (I) to (IV), but in the case where the dispersion compensation element 10Y comprises three or more regions, it is preferable that as shown in FIG. 6B, regions are arranged such that optical attenuation by reflection resulting from a difference in refractive index at the boundary between regions adjacent to each other is minimized. Specifically, it is desirable that regions (I) to (IV) are arranged in the order of magnitude of the interval a.

Figure 8:
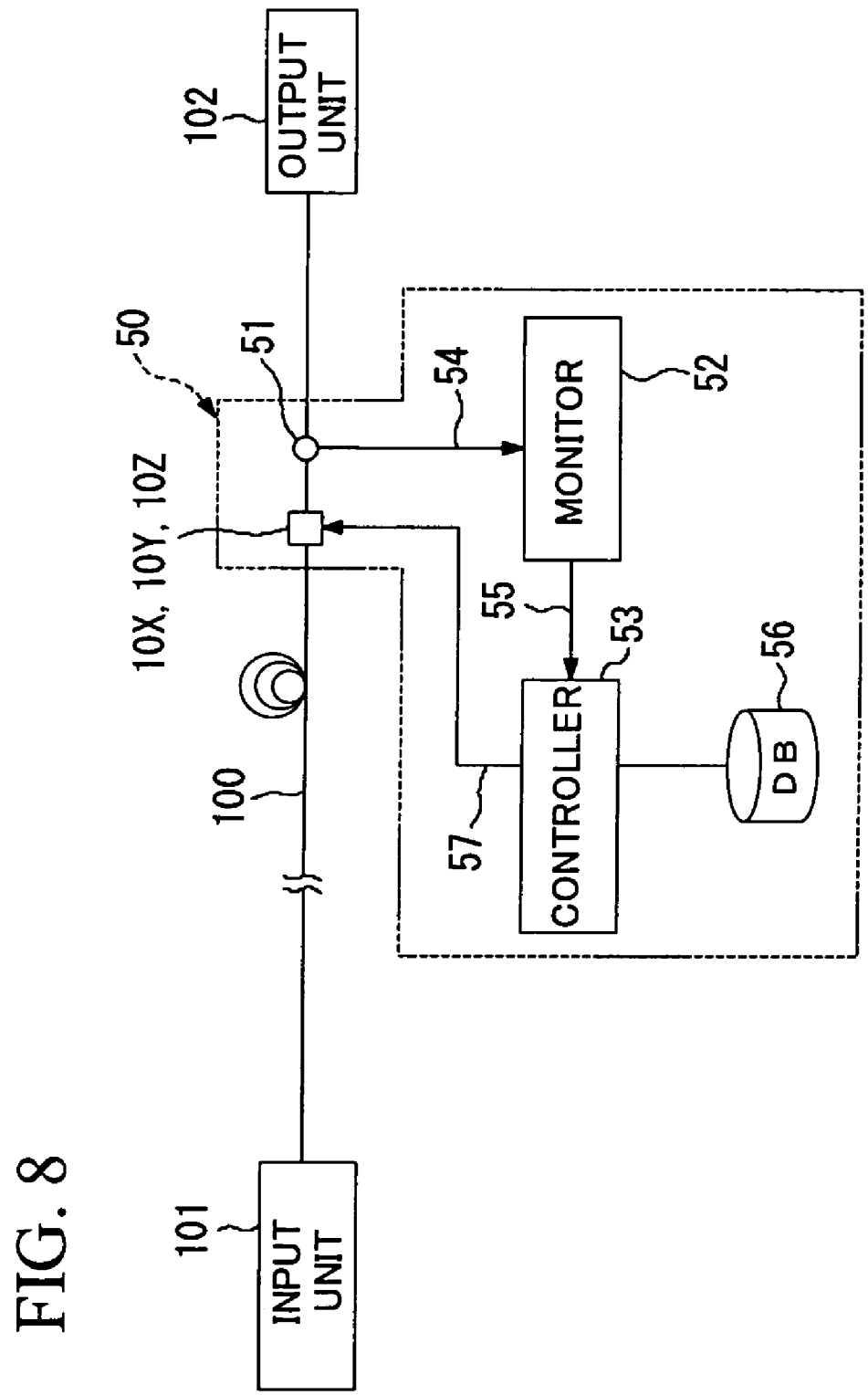
FIG. 8 shows the outlined configuration of a dispersion compensation system.

FIG. 8 shows the configuration of a dispersion compensation system 50 configured using the dispersion compensation element 10X or 10Y described above.

The dispersion compensation system 50 is provided on an optical fiber transmission line 100.

The optical fiber transmission line 100 is laid over a long distance on, for example, a sea bottom or the like, and an optical pulse string input from the input unit 101 side of a transmission server or the like is transmitted via the optical fiber transmission line 100 and exits from the output unit 102 side of a reception server or the like.

The dispersion compensation system 50 is provided in the vicinity of the output unit 102, and comprises a coupler (pulse pickup unit) 51, a monitor 52, a controller (control unit, voltage control unit) 53, and the dispersion compensation element 10X or 10Y (hereinafter abbreviated simply as 10X).

The coupler 51 picks up an optical pulse from the optical fiber transmission line 100.

The monitor 52 receives the optical pulse picked up by the coupler 51 via shortest possible optical fibers 54 for which the influence of chromatic dispersion is negligible, and monitors the wave form of the optical pulse. Specifically, the waveform on the plane of a time-spectrum of the optical pulse picked up from the optical fiber transmission line 100 is monitored (measured), chromatic dispersion possessed by the optical pulse under waveform control is resolved into a coefficient for each order to be determined, and the coefficient is output as chromatic dispersion information. For this monitor 52, a configuration described in, for example, K Ogawa, "Real-time intuitive spectrogram measurement of ultrashort optical pulses using two-photon absorption in a semiconductor", [online], Mar. 11, 2002, Optics Express, Vol. 10, No. 5, p.

262-267, Optical Society of America, [search: Jan. 14, 2003], Internet URL: http://www.opticsexpress.org/abstract.cfm?URI=OPEX-10-5-262, and therefore detailed description thereof is not particularly presented.

The controller 53 receives chromatic dispersion information output from the monitor 52 via short optical fibers 55. This controller 53 comprises a database (data storage unit) 56, and in this data base 56, data of the amount of voltage applied at electrodes 30A and 30B of the dispersion compensation element 10X, which matches the sign and the absolute value of chromatic dispersion, is stored.

In the controller 53, chromatic dispersion information output from the monitor 52 is received, a database 56 is referenced to obtain data of the amount of voltage applied at electrodes 30A and 30B for the dispersion compensation element 10X to generate chromatic dispersion equal in absolute value and opposite in sign to the chromatic dispersion information (coefficient of chromatic dispersion) received from the monitor 52. The obtained data of the amount of voltage applied is output to the dispersion compensation element 10X.

The dispersion compensation element 10X is provided such that the defect waveguide 25 lies on the optical fiber transmission line 100, and an optical pulse propagated through the optical fiber transmission line 100 is input from the input edge of the defect waveguide 25 on one edge side, and is output from the output edge on the other edge side to the optical fiber transmission line 100.

An electric power source (not shown) for applying voltages to electrodes 30A and 30B of the dispersion compensation element 10X, and a controller (not shown) controlling the amount of voltage applied at the electric power source are connected to the dispersion compensation element 10X.

The data of the amount of voltage applied, output from the controller 53, is transferred to a controller (not shown) of the dispersion compensation element 10X via optical fibers 57. In the controller, predetermined voltages are applied from the electric power source to electrodes 30A and 30B based on the received data of the amount of voltage applied to change the refractive indexes of the regions (I) and (II).

In this way, in the dispersion compensation system 50, an optical pulse picked up from the optical fiber transmission line 100 is monitored by the monitor 52, and based on the chromatic dispersion information, the amount of voltage applied at the dispersion compensation element 10X is controlled by the controller 53. In this way, optimum dispersion compensation can be performed constantly even if variations in conditions associated with temperature, weather and the like occur in the optical fiber transmission line 100.

In the dispersion compensation element 10X, the sign of chromatic dispersion compensation is made variable independently of the absolute value of chromatic dispersion, whereby positive and negative dispersion compensation can be performed, thus making it possible to perform dispersion compensation even if chromatic dispersion in the optical fiber transmission line 100 constantly varies between positive and negative signs.

The above discussion is similarly applied to not only use of the dispersion compensation element 10X but also use of the dispersion compensation element 10Y, and if the dispersion compensation element 10Y is employed, not only positive and negative dispersion compensation but also dispersion compensation of multiple orders can be performed.

As a result, by using the dispersion compensation elements 10X and 10Y and the dispersion compensation system 50 using the dispersion compensation elements, chromatic dispersion compensation accommodating ultrahigh-speed large-capacity optical communications using a broad spectral band can be achieved, thus making it possible to sufficiently achieve further enhancement of the transmission speed.

Particularly, the dispersion compensation elements 10X and 10Y have regions merely made different in radius r and interval a of the hole 24, and therefore does not have a particularly complicated structure, thus making it possible to achieve the above effect at a relatively low cost.

In the controller 53, information previously stored in the database 56 is referenced to control the amount of voltage applied at electrodes 30A and 30B, and it is not necessary to perform complicated processing and the like on the spot, thus making it possible to fabricate the controller 53 itself at a low cost.

In the above dispersion compensation element 10X or 10Y, a bias voltage is applied using the electrode 30 to change the refractive index of the photonic crystal unit 20, but by injecting a carrier (electrons or positive holes) as impurities into the core layer 23 and applying a bias voltage, the absorption spectrum (imaginary part of refractive index) of the photonic crystal unit 20 can be changed.

Figure 9:
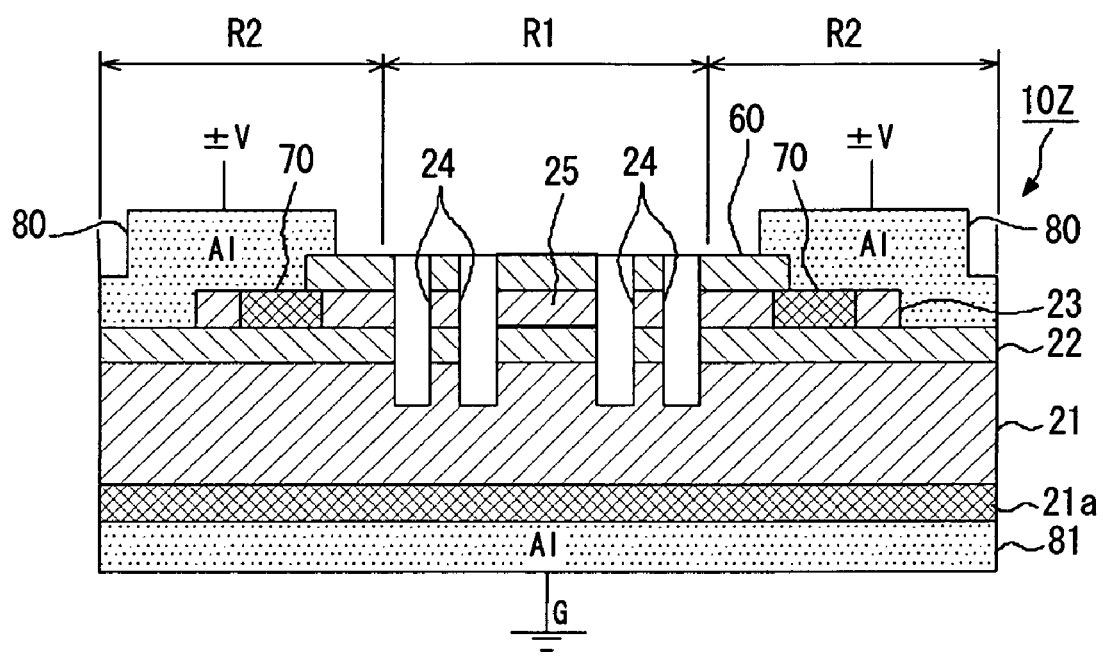
FIG. 9 is a sectional view showing an example of the dispersion compensation element whose refractive index is made variable by varying the carrier density of a defect waveguide.

FIG. 9 shows an example of such a dispersion compensation element 10Z.

As shown in FIG. 9, the dispersion compensation element 10Z generally has a structure in which the clad layer 22 and the core layer 23 are deposited on the substrate 21, and a clad layer 60 is deposited on the core layer 23. The substrate 21 is formed with, for example, silicon (Si), the clad layers 22 and 60 are formed with a silicon oxide film ($SiO_2$) or silicon nitride film, and the core layer 23 is formed with a silicon crystal (Si) that is a dielectric material. The substrate 21 has a thickness of, for example, about 500 μm, the clad layers 22 and 60 each have a thickness of, for example, 200 nm to 1 μm, and 300 nm as a specific example, and the core layer 23 has a thickness of about 250 nm.

The dispersion compensation element 10Z has the substrate 21, the clad layer 22, the core layer 23 and the clad layer 60 formed so as to elongate laterally from a region R1 (hereinafter referred to as photonic crystal region) in which holes 24 are formed in a cross section orthogonal to a direction in which the defect waveguide 25 continues, i.e. the cross section shown in FIG. 9. That is, the photonic crystal region R1 in which holes 24 are formed exists in both sides of the defect waveguide 25 at the center, and an extension region R2 in which no hole 24 is formed is formed outside the photonic crystal region R1.

On the core layer 23 sandwiched between the clad layers 22 and 60 in its top and bottom, a region (region of different density) different in carrier density from the defect waveguide 25 at the center is formed in the extension region R2 as a terminal unit 70.

In this dispersion compensation element 10Z, an electrode (dispersion varying means, energy supplier) 80 for applying a voltage is electrically connected to the terminal unit 70, and a reference electrode 81 for supplying a reference potential is electrically connected to the substrate 21 on the bottom side.

The terminal unit 70 is made different in carrier density from the defect waveguide 25 by doping or undoping the terminal unit 70 with impurities (electrons or positive holes) contained in the core layer 23. If the electrode 80 is electrically connected to the terminal unit 70, and a bias voltage is applied to the terminal unit 70, electrons or positive holes move due to a difference in carrier density between the part of the defect waveguide 25 and the part of the terminal unit 70, whereby the carrier density of the part of the defect waveguide 25 is changed, and the absorption spectrum is changed. For example, when p-type elements are used as impurities, positive holes gather in the defect waveguide 25 at the center from the terminal unit 70 on both sides to increase the carrier density of the defect waveguide 25 if + (positive) bias voltage is applied, and positive holes move to the terminal unit 70 on both sides from the defect waveguide 25 to decrease the carrier density of the defect waveguide 25 if − (negative) bias voltage is applied.

The carrier density of the terminal unit 70 may be decreased compared to the part of the defect waveguide 25, but it is preferable that the carrier density of the terminal unit 70 is increased compared to the part of the defect waveguide 25, namely it is doped with impurities by ion injection or the like. This is because if the carrier density of the terminal unit 70 is increased compared to the part of the defect waveguide 25, the electric resistance decreases at the terminal unit 70 to which the electrode 80 is connected, and the electric resistance of the part of the defect waveguide 25 increases to facilitate concentration of electric fields.

Such impurities include p-type elements such as B (boron), Al (aluminum), Ga (gallium), In (indium) and Tl (thallium), and n-type elements such as N (nitrogen), P (phosphorus), As (arsenic), Sb (antimony) and Bi (bismuth), which are also used in semiconductors. Among them, for the p-type element, B (boron) is especially suitable because of easy doping.

When B (boron) of p-type elements is used as impurities for doping, the carrier density of the terminal unit 70 is preferably $5 \times 10^{18}$ to $5 \times 10^{19}/cm^3$, e.g. $1 \times 10^{19}/cm^3$ if the carrier density (the number of impurity elements) of the defect waveguide 25 is $10^{17}/cm^3$, for example.

In this case, it is preferable that the substrate 21 has a carrier density equivalent to that of the defect waveguide 25. This is because if the substrate 21 and the defect waveguide 25 are different in carrier density, a charge distribution occurs between them to complicate the design and the like.

It is preferable that a face 21a in which the reference electrode 81 is connected to the substrate 21 is doped with impurities for decreasing the electric resistance, so that it has a carrier density equivalent to that of, for example, the terminal unit 70.

Figure 10:
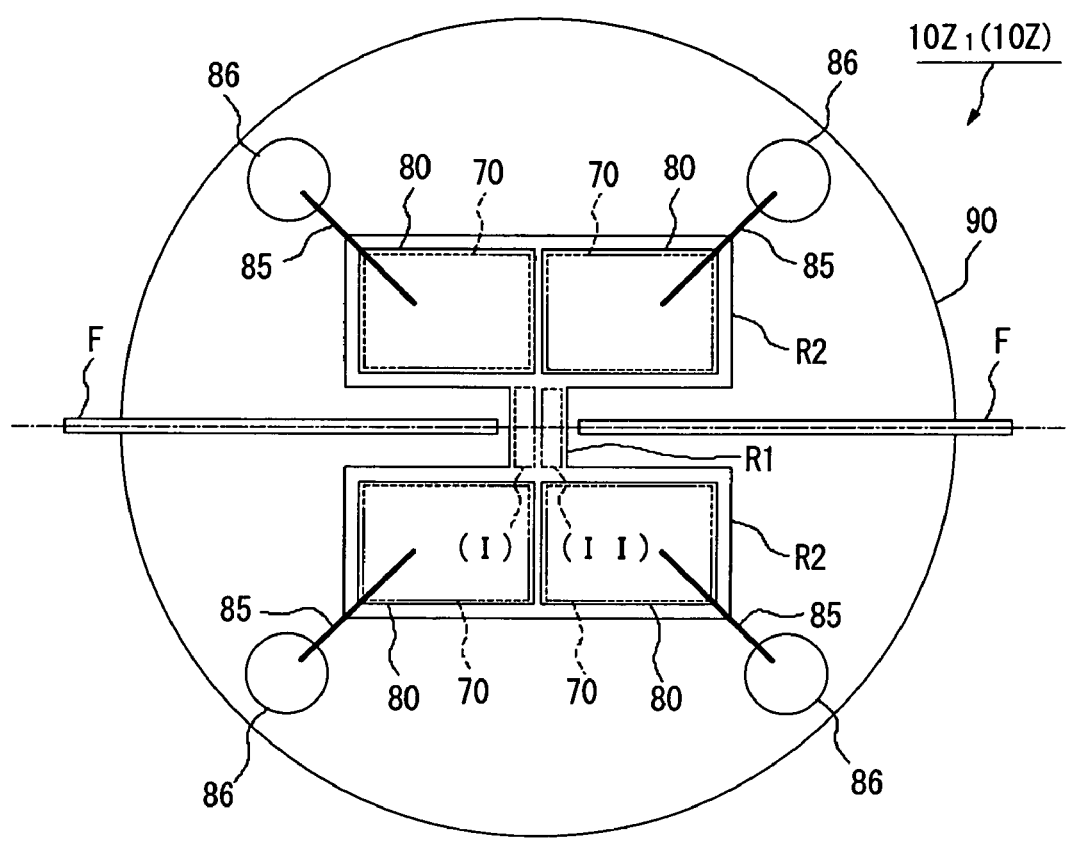
FIG. 10 is a plan view showing an example of the dispersion compensation element having a cross section structure shown in FIG. 9.

FIG. 10 shows one example of the dispersion compensation element 10Z having a cross section structure shown in FIG. 9.

As shown in FIG. 10, a dispersion compensation element $10Z_1$ is mounted on a mount 90 and formed such that the area of the terminal unit 70 formed on the extension region R2 on both sides of the photonic crystal region R1 is relatively large compared to the area of the photonic crystal region R1, and thus has substantially a zygal shape when viewed planewise. This is intended for increasing the area of the terminal unit 70 wherever possible to decrease its electric resistance.

Like the dispersion compensation element 10X shown in FIG. 1, this dispersion compensation element $10Z_1$ has regions (I) and (II) set so as to be different in radius r and interval a of holes 24. For applying bias voltages to respective regions (I) and (II) independently, the dispersion compensation element $10Z_1$ has terminal units 70 and electrodes 80 provided on both sides of regions (I) and (II), and an external electrode 86 provided on the mount 90 is electrically connected via a lead 85 to each of four electrodes 80.

Hemispherical-ended optical fibers F are placed in such a manner as to face both ends of the defect waveguide 25 of the photonic crystal region R1, whereby optical pulses are guided to the defect waveguide 25, and guided to outside after receiving dispersion compensation.

Figure 11:
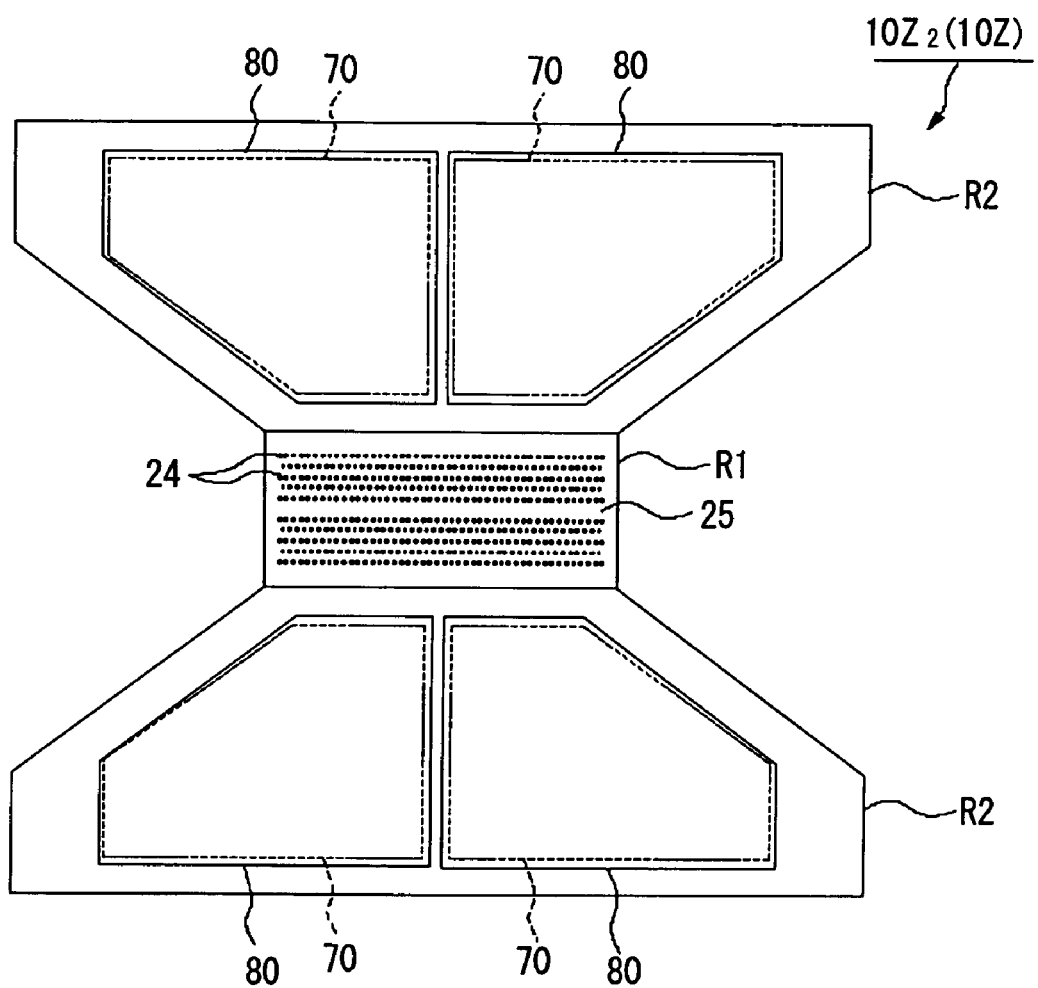
FIG. 11 is a plan view showing another example of the dispersion compensation element having the cross section structure shown in FIG. 9.

FIG. 11 shows another example of the dispersion compensation element 10Z having a cross section structure shown in FIG. 9.

As shown in FIG. 11, a dispersion compensation element $10Z_2$ is formed such that the electrode 80 and the terminal unit 70 provided on the extension region R2 extending on both sides of the photonic crystal region R1 has trapezoidal (or fan) shape relative to the photonic crystal region R1. In this way, it is possible to provide increased areas of the terminal unit 70 and the electrode 80 while the distance to the photonic crystal region R1 having a small area compared to the terminal unit 70 and the electrode 80 is shortened wherever possible. This is also effective for decreasing the electric resistance of the terminal unit 70.

Figure 12:
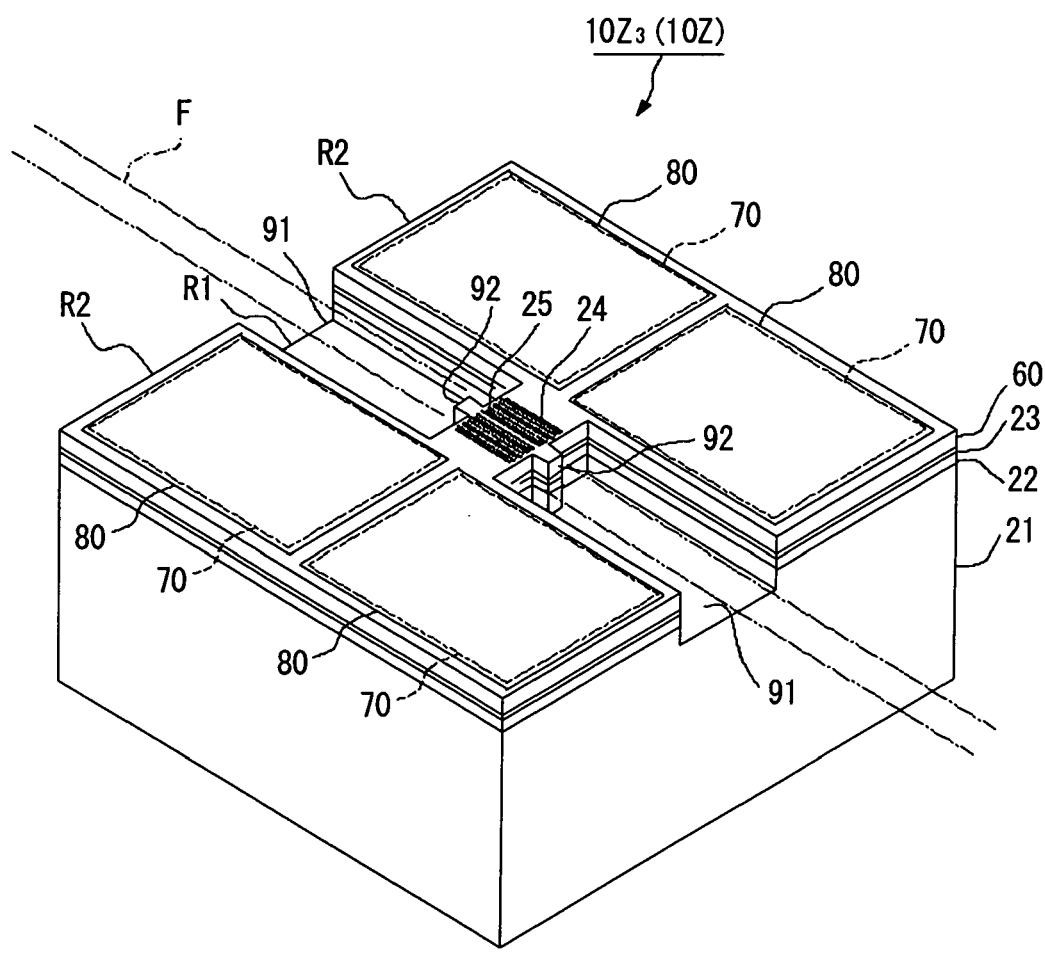
FIG. 12 is a perspective view showing still another example of the dispersion compensation element having the cross-section structure shown in FIG. 9.

FIG. 12 shows still another example of the dispersion compensation element 10Z having a cross-section structure shown in FIG. 9.

As shown in FIG. 12, a dispersion compensation element $10Z_3$ is formed such that only the surface thereof has substantially a zygal shape like the dispersion compensation element $10Z_1$ shown in FIG. 10, and the areas of the terminal unit 70 and the electrode 80 extending on both sides of the photonic crystal region R1 are large compared to the photonic crystal region R1. In the substrate 21, only the upper part has substantially a zygal shape when viewed planewise, and the lower part has substantially a rectangular shape when viewed planewise.

This dispersion compensation element $10Z_3$ is obtained by depositing on the substrate 21 the clad layer 22, the core layer 23 and the clad layer 60 to form a block having a rectangular shape when viewed planewise, and then removing the photonic crystal region R1 on the side of both ends of the defect waveguide 25 by etching or the like to form step portions 91. At this time, raised portions 92 are formed at both ends of the defect waveguide 25 of the photonic crystal region R1, and optical fibers F are made to face the raised portions 92. For this purpose, the depth of the step portion 91 is preferably set according to the outer diameter of the optical fiber F.

The dispersion compensation elements $10Z_1$ to $10Z_3$ shown in FIGS. 10 to 12 have regions (I) and (II) set so as to be different in radius r and interval a of holes 24, but they may have three or more regions, for example four regions like the dispersion compensation element 10Y shown in FIG. 6. In this case, terminal units 70 are provided according to the number of regions.

In this dispersion compensation element 10Z, the dispersion compensation system 50 shown in FIG. 8 may be formed.

In this case, in the controller 53, data of the amount of voltage applied at the electrode 80 to the dispersion compensation element 10Z, which match the sign and the absolute value of chromatic dispersion, is stored in the database 56. In the controller 53, the database 56 is referenced to obtain data of the amount of voltage applied at the electrode 80, which match chromatic dispersion information received from the monitor 52, and the data is output to the dispersion compensation element 10Z.

The data of the amount of voltage applied, output from the controller 53, is transferred to a controller (not shown) of the dispersion compensation element 10Z via optical fibers 57. The controller generates a predetermined voltage from the electric power source based on the received data of the amount of voltage applied, and applies the voltage to the terminal unit 70 via the electrode 80 to change the refractive indexes of regions (I) and (II) of the defect waveguide 25.

In this way, in the case of the dispersion compensation element 10Z, optimum dispersion compensation can be performed constantly even if variations in conditions associated with temperature, weather and the like occur in the optical fiber transmission line 100, owing to the dispersion compensation system 50. As a result, chromatic dispersion compensation accommodating ultrahigh-speed large-capacity communications using a broad spectral band can be achieved, and further enhancement of the transmission speed can be sufficiently achieved.

In the embodiment described above, in the dispersion compensation elements 10X, 10Y and 10Z, the electrode 30 is used to apply a bias voltage to change the refractive index of the photonic crystal unit 20, but other means may be used as dispersion compensation means.

For example, a heater is provided in each region, and a current is passed through the heater to elevate the temperature of the core layer 23. Using temperature dependence of the refractive index, the chromatic dispersion of the photonic crystal waveguide can be changed to contribute to chromatic dispersion compensation.

Moreover, stresses can be applied from both faces of the photonic crystal unit 20 from a piezoelectric element to add a distortion, thereby changing the refractive index.

Figure 13A:
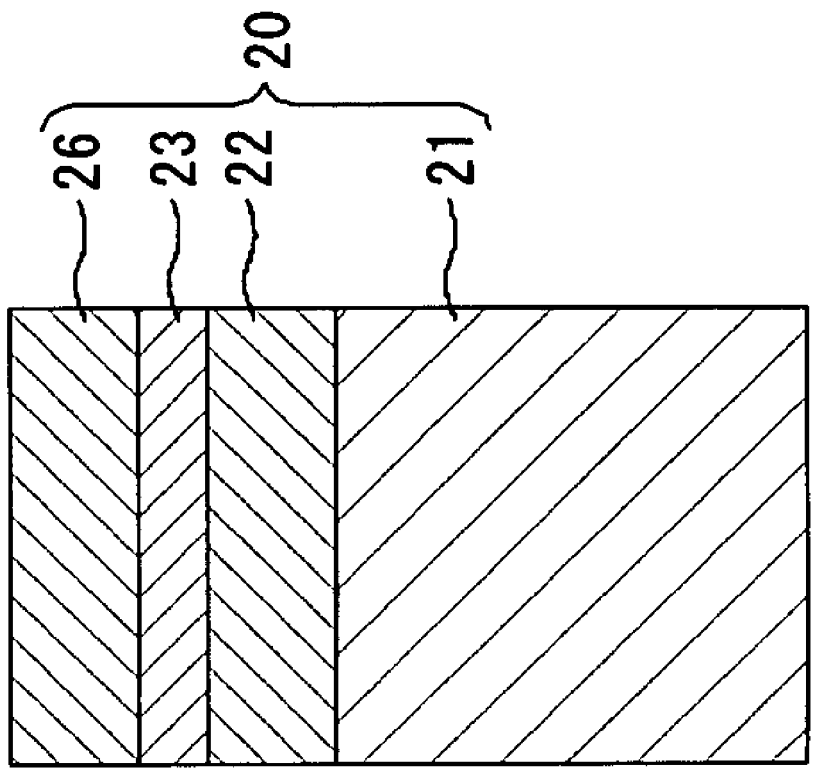
FIG. 13 shows another example of the dispersion compensation element.
Figure 13B:
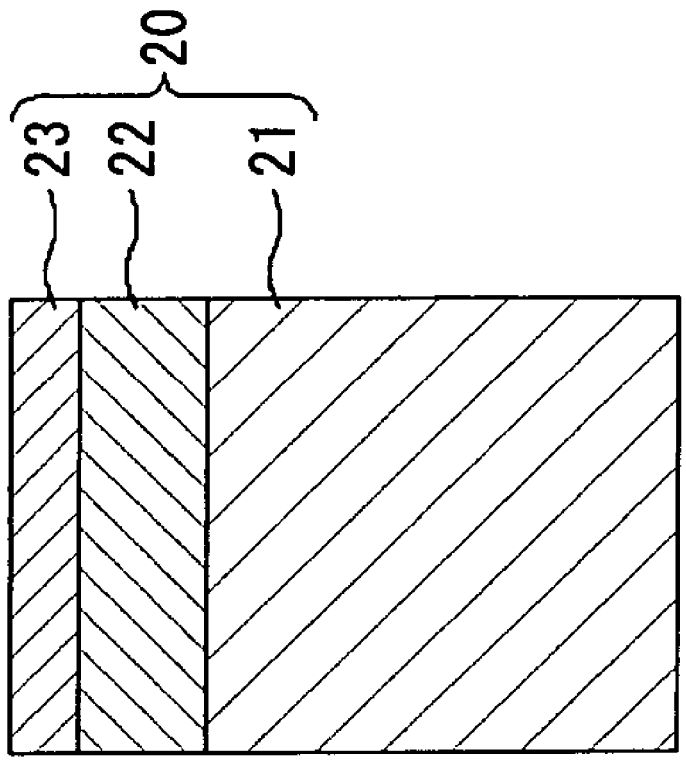

In the photonic crystal unit 20, as shown in FIG. 13A, only the clad layer 22 and core layer 23 are provided on the substrate 21, and air contacts one side of the core layer 23, but instead thereof, a clad layer (another layer) 26 may be further provided on the upper side of the core layer 23 as shown in FIG. 13B. In this case, for the clad layer 26, $SiO_2$ may be used as in the case of the clad layer 22. The thickness of the clad layer 22 is 500 nm as a preferred aspect. The thicknesses of other parts are same as those described above.

The linear defect waveguide 25 is formed on the core layer 23, but the defect waveguide is not limited to a linear shape, and may have a bended or curved shape. Moreover, in the embodiment described above, the defect waveguide 25 is two-dimensionally formed, but it may be three-dimensionally formed.

In addition, optical materials and optical elements other than photonic crystals may be used without any problems as long as they have a capability of dispersion for light, which is equivalent to that described above.

In addition, in the dispersion compensation system 50, the optical pulse is monitored and dispersion compensation is controlled by the monitor 52 and the control apparatus 53, but the coupler 51, the monitor 52 and the controller 53 can be omitted to perform constant dispersion compensation in the case of an operating environment in which optical pulse propagation conditions in the optical fiber transmission line 100 are not significantly varied.

Servers, various kinds of terminals and the like which are used in the input unit 101 and the output unit 102 usually send signals to and receive signals from the optical fiber transmission line 100. The dispersion compensation system 50 preferably performs dispersion compensation just before reception of a signal and therefore, actually, it is preferable that the dispersion compensation system 50 is provided at both ends of the optical fiber transmission line 100.

In addition, for the dispersion compensation system 50, the monitor 52, the controller 53 and the dispersion compensation element 10X, 10Y or 10Z may be integrated as one apparatus, or they may be separate units.

In addition, the configurations described in the above embodiment may be adopted or rejected, or changed to other configurations as appropriate within the spirit of the present invention.

INDUSTRIAL APPLICABILITY

According to the present invention, a plurality of regions are provided, whereby, for example, positive and negative dispersion compensation and dispersion compensation of multiple orders can be performed. Chromatic dispersion in each region is varied, whereby the absolute value and the sign of chromatic dispersion compensation can be made variable.

Alternatively, dispersion compensation can be performed by applying a voltage to vary the carrier density of a waveguide to change the refractive index of the waveguide.

Optical pulses picked up from an optical fiber transmission line is monitored, and chromatic dispersion is controlled based on the chromatic dispersion information, whereby optimum dispersion compensation can be performed constantly even if variations in conditions associated with temperature, weather and the like occur in the optical fiber transmission line.

As a result, chromatic dispersion compensation accommodating ultrahigh-speed large-capacity communications using a broad spectral band can be achieved, and further enhancement of the transmission speed can be sufficiently achieved.

The invention claimed is:

1. A dispersion compensation element compensating chromatic dispersion of an optical pulse input from outside, characterized by comprising:
   a waveguide guiding said optical pulse from an input edge to an output edge; and
   dispersion varying means for making variable the absolute value of the chromatic dispersion and for making variable the sign of chromatic dispersion, independent of the absolute value of the chromatic dispersion, given to said optical pulse in said waveguide.

2. The dispersion compensation element according to claim 1, characterized in that said dispersion compensation element is formed by arranging two material having different dielectric constants alternately and periodically in a direction in which said waveguide continues, and a plurality of regions different in combination of the size and the interval of one said material existing in the other said material are arranged along a direction in which said waveguide continues.

3. The dispersion compensation element according to claim 2, characterized in that a plurality of said regions are mutually different in sign of chromatic dispersion for said optical pulse.

4. The dispersion compensation element according to claim 2, characterized in that a plurality of said regions are mutually different in order of chromatic dispersion for said optical pulse.

5. The dispersion compensation element according to claim 4, characterized in that said dispersion compensation element compensates chromatic dispersion of up to the nth order, and said regions are provided in a number of $2(n-1)$.

6. The dispersion compensation element according to claim 2, characterized in that a plurality of said regions are provided in an arrangement such that the reflection of said optical pulse in the boundary between said regions in tandem with each other is minimized.

7. The dispersion compensation element according to claim 2, characterized by comprising an energy supplier for supplying energy changing the refractive index of said waveguide independently from outside for each said region of said waveguide as said dispersion varying means.

8. The dispersion compensation element according to claim 7, characterized in that said energy supplier applies a voltage to vary the carrier density of said waveguide to change the refractive index of said waveguide.

9. The dispersion compensation element according to claim 8, characterized in that said dispersion compensation element further comprises a terminal unit different in carrier density from said waveguide, and said energy supplier for applying a voltage is electrically connected to said terminal unit.

10. A dispersion compensation element compensating chromatic dispersion of an optical pulse input from outside, characterized by comprising:

a waveguide guiding said optical pulse from an input edge to an output edge; and a dispersion varying means which is different in carrier density from said waveguide and makes the absolute value and the sign of chromatic dispersion independently variable, which are given to said optical pulse in said waveguide by applying a voltage from outside to change the refractive index of said waveguide.

* * * * *